US007832998B1

(12) United States Patent
Beauregard et al.

(10) Patent No.: US 7,832,998 B1
(45) Date of Patent: Nov. 16, 2010

(54) CONTROLLED SKIN FORMATION FOR FOAMED EXTRUDATE

(75) Inventors: Donald V. Beauregard, Jamestown, RI (US); Nick R. Schott, Westford, MA (US); Stephen A. Orroth, Windham, NH (US); Dwayne R. Cote, Nashua, NH (US); Danielle L. Froio, Watertown, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1056 days.

(21) Appl. No.: 11/586,278

(22) Filed: Oct. 26, 2006

(51) Int. Cl.
*B29C 47/88* (2006.01)

(52) U.S. Cl. .................. 425/67; 425/192 R; 425/377; 425/378.1; 425/461

(58) Field of Classification Search .............. 425/67, 425/192 R, 197, 377, 378.1, 461
See application file for complete search history.

(56) References Cited

U.S. PATENT DOCUMENTS

| | | | |
|---|---|---|---|
| 3,871,807 A | * | 3/1975 | Meyniel et al. .......... 425/326.1 |
| 3,941,550 A | | 3/1976 | Marion |
| 4,564,350 A | | 1/1986 | Holmes et al. |
| 4,663,107 A | | 5/1987 | Takada et al. |
| 4,755,118 A | * | 7/1988 | Ondush et al. ............... 425/71 |
| 4,844,762 A | | 7/1989 | Schroder |
| 4,856,974 A | | 8/1989 | Wolfe, Jr. |
| 6,103,152 A | | 8/2000 | Gehlsen et al. |
| 2001/0043991 A1 | | 11/2001 | Watkins |
| 2002/0122941 A1 | | 9/2002 | Kelley |

* cited by examiner

*Primary Examiner*—Yogendra N Gupta
*Assistant Examiner*—Joseph Leyson
(74) *Attorney, Agent, or Firm*—James M. Kasischke; Jean-Paul A. Nasser; Michael P. Stanley

(57) ABSTRACT

An extrusion apparatus is taught that employs a die adapter that is partially submerged in a heat transfer bath on a horizontal plane such that there is no air gap between the die extrusion aperture and the heat transfer bath. A porous dam is positioned between the die and the heat transfer bath. A heat insulating plate is positioned between the porous dam and the die to prevent the heat transfer medium from flowing onto the die. The heat insulating plate also prevents excessive cooling of the die tip thereby allowing the necessary precise thermal control over the extrudate skin formation to prevent melt fracture and form a low density extrudate with a smooth solid skin and inner foamed core.

1 Claim, 3 Drawing Sheets

US 7,832,998 B1

CONTROLLED SKIN FORMATION FOR FOAMED EXTRUDATE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to the extrusion of plastics, and more specifically to a method for achieving a very smooth extrudate surface using thermoplastic syntactic foam materials.

(2) Description of the Prior Art

Currently, technology is being sought that produces a very low-density, extrudable thermoplastic foam material with application to communication cable jacket materials for use in underwater applications. A new lower density foamed jacket with a smoother surface is required in order to improve the speed and underwater depth performance of several communication systems. The smoother the surface, the less drag will be exhibited while towing a cable underwater. A smoother surface will also result in improved jacket sealing and handling. Metallocene catalyzed polyolefin incorporating a thermoplastic syntactic foam material is ideally suited for producing a low density foam. Unfortunately this material exhibits a high degree of melt fracture during the extrusion process. As such, a smooth extrudate surface is difficult to achieve. What is needed, therefore, is a method of extruding metallocene catalyzed polyolefin incorporating a thermoplastic syntactic foam material in such a way as to produce a smooth extrudate surface that does not exhibit significant melt fracture during the extrusion process.

SUMMARY OF THE INVENTION

It is a general purpose and object of the present invention to disclose a method and apparatus to control the skin formation of a foamed extrudate.

It is a further object to employ an insulating plate to shield and control cooling of the die used to extrude the foam such that a low density extrudate with a solid skin and inner foamed core is achieved.

The above objects are achieved with the present invention by using a die adapter that is partially submerged in a heat transfer bath on a horizontal plane such that there is no air gap between the die extrusion aperture and the heat transfer bath. A porous dam is positioned between the die and the heat transfer bath. A heat insulating plate is positioned between the porous dam and the die to prevent the heat transfer medium from flowing onto the die. The heat insulating plate also prevents excessive cooling of the die tip thereby allowing the necessary precise thermal control over the extrudate skin formation to prevent melt fracture and form a low density extrudate with a smooth solid skin and inner foamed core.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION

Figure 1:
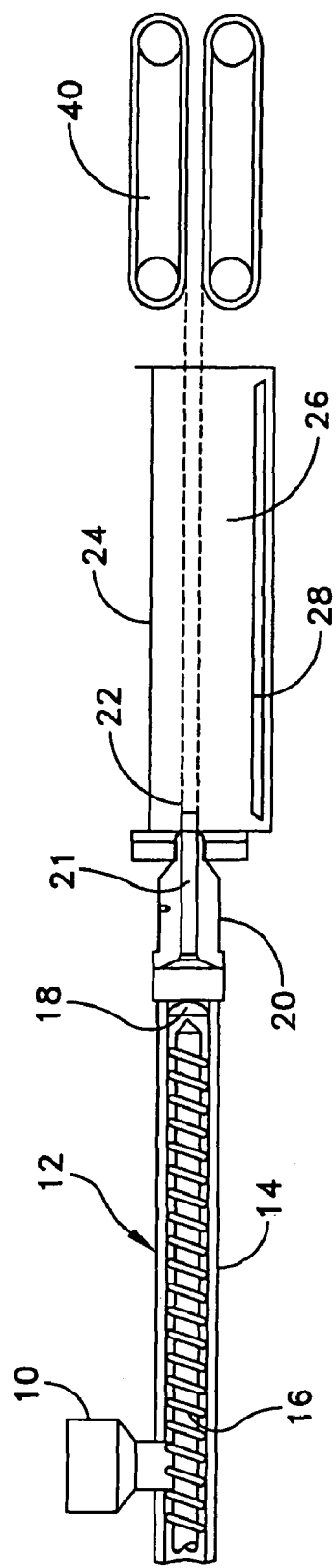
FIG. 1 is an illustration of the entire extrusion apparatus including the arrangement of the porous dam and insulating plate relative to the die and heat transfer bath.
Figure 2A:
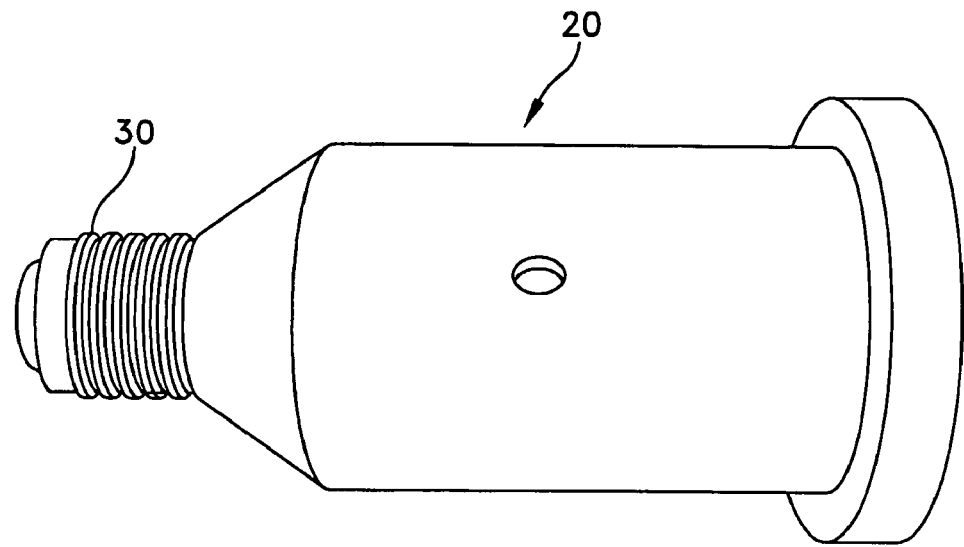
FIG. 2a is an illustration of the die used to perform the extrusion process.
Figure 2B:
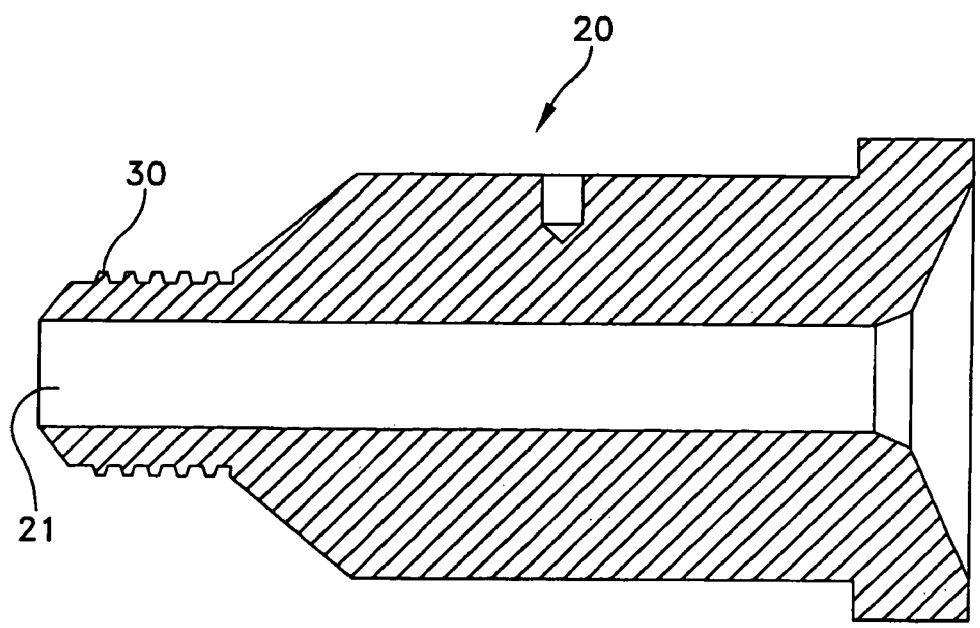
FIG. 2b is a cross sectional view of the die used to perform the extrusion process.
Figure 3A:
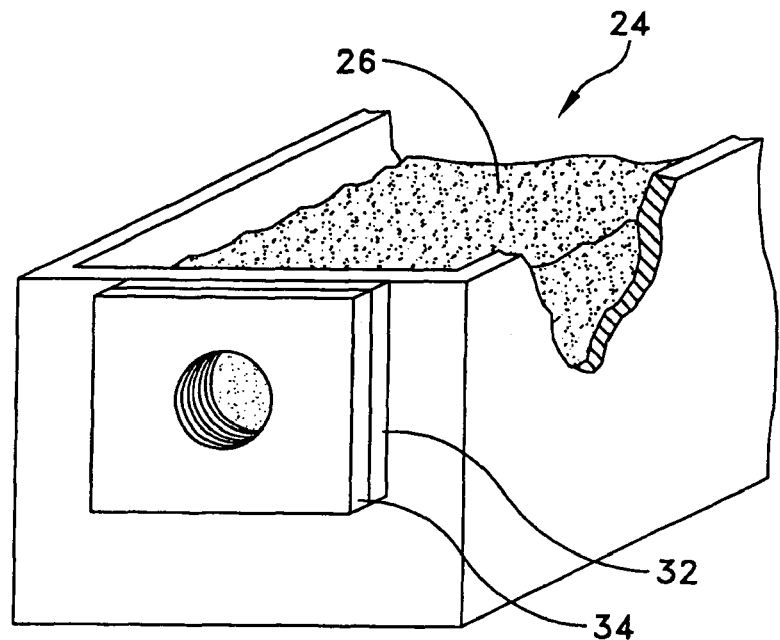
FIG. 3a is an illustration of the heat transfer bath and the porous dam and insulation plate.
Figure 3B:
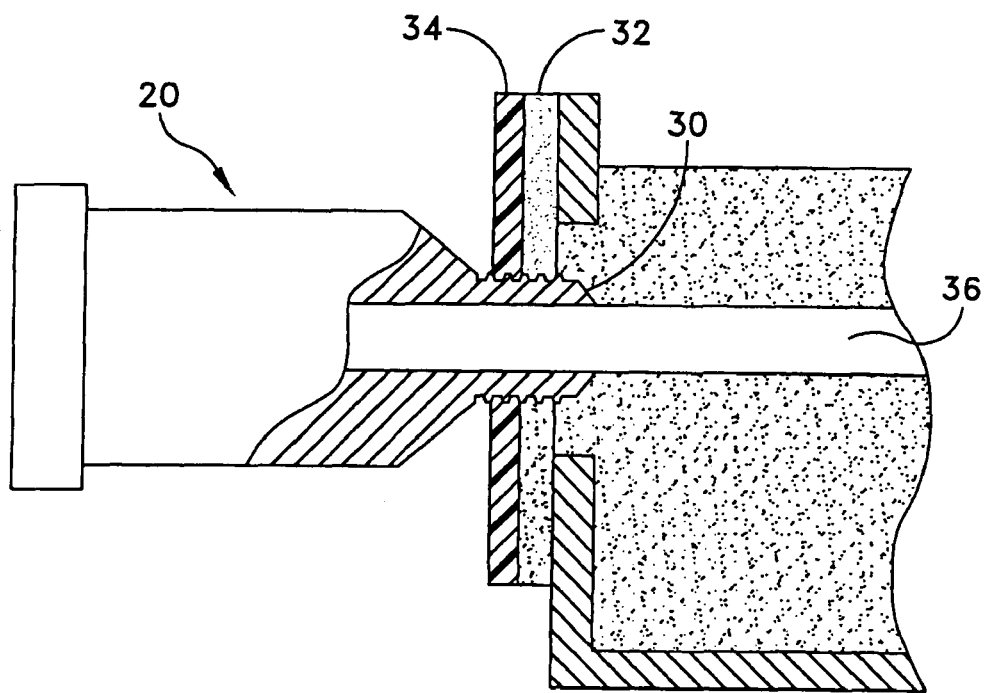
FIG. 3b is a partial cross-sectional illustration of the die with the die tip submerged in the heat transfer bath and the porous dam and insulation plate.

Referring to FIG. 1, the apparatus by means of which the present invention may be practiced includes a gravity fed hopper 10 into which the components of the metallocene catalyzed polyolefin incorporating a thermoplastic syntactic foam are initially added. The components are then metered into an extruder 12, which is made up of a barrel 14 with a single screw 16. The extruder 12 also has a breaker plate 18 and then a die 20 at its terminal end. The barrel 14 is heated to heat the metallocene catalyzed polyolefin as it progresses to the die 20. FIGS. 2a and 2b illustrates the details of the die, a ½" diameter, 10:1 L/D die adapter. The die 20 has a cylindrical extrusion channel 21 through which the compound is forced. A hot extrudate 22 leaves the die 20 into a heat transfer bath 24. The heat transfer bath consists of a reservoir 26 having copper heating coils 28 and filled with water which serves as the heat transfer medium. Referring to FIGS. 3a and 3b it is shown that the tip of the die 30 is submerged directly into the heat transfer bath 24 on a horizontal plane. Between the die 20 and the heat transfer bath 24 is a porous dam 32 to eliminate any air gap between the tip of the die 30 and the heat transfer bath 24. A ¼" thick insulating plate 34 made of a nonporous liquid impermeable material is positioned between the porous dam 32 and the die 20 to support the porous dam 32 and to prevent the heat transfer medium 26 from flowing onto the die 20. Due to the insulating properties of the insulating plate 34, excessive cooling is prevented, therefore allowing precise thermal control over the formation of the extrudate with minimum melt fracture. In addition, the prevention of excessive cooling results in an integral outer skin over the foam cells which significantly reduces radial water absorption under hydrostatic pressure, while maintaining the mechanical integrity and flexibility of the foam cable jacket material. Cooled extrudate 36 leaves the heat transfer bath 24 and enters roller apparatus 40. The cooled extrudate 36 passes through the roller apparatus 40 and emerges a completed rolled extrudate.

Variables in the process such as head pressure developed is largely dependent on screw speed, melt viscosity, die design and the use of a breaker plate. In the preferred embodiment, the shear rate and residence time in the extruder 12 depend upon the invention using both a 24:1 and 30:1 L/D extruders 12. In the preferred embodiment, the screw 16 has a compression ratio of 2.5-3:1. The screw 16 is a single stage screw with approximately one-third of the screw 16 comprising the feed section, one-third of the screw 16 comprising the transition and one-third of the screw 16 comprising the metering section of the screw. A screw with a Maddock mixing section and/or a screw with a Pulsar mixing section can be used.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. An apparatus for extruding metallocene catalyzed polyolefin incorporating a thermoplastic syntactic foam material comprising:

a gravity fed hopper into which the components of the metallocene catalyzed polyolefin incorporating a thermoplastic syntactic foam are initially added;

an extruder into which the components are then metered into, said extruder comprising a barrel with a single screw and a breaker plate, wherein said barrel is heated to heat the components of metallocene catalyzed polyolefin incorporating a thermoplastic syntactic foam as it progresses through the barrel as an extrudate;

a die at the terminal end of said extruder, said die having a tip and a ½" diameter cylindrical extrusion channel through which the extrudate is channeled;

a heat transfer bath comprising a reservoir having a plurality of copper heating coils and filled with a heat transfer medium, wherein the tip of the die is submerged directly into the heat transfer bath on a horizontal plane so that the extrudate will emerge from the die and into the heat transfer bath;

a porous dam positioned between the die and the heat transfer bath to eliminate any air gap between the tip of the die and the heat transfer bath;

an insulating plate positioned between the porous dam and the die to support the porous dam and to prevent the heat transfer medium from flowing onto the die, wherein due to the insulating properties of the plate, excessive cooling is prevented, thereby avoiding melt fracture of the extrudate and allowing the formation of a smooth extrudated outer skin; and a roller apparatus joined to said heat transfer bath through which the cooled extrudate passes through and emerges a completed rolled extrudate with a low density and a smooth solid skin and inner foamed core.

* * * * *